(12) United States Patent
Yoshimine

(10) Patent No.: US 7,702,506 B2
(45) Date of Patent: Apr. 20, 2010

(54) CONVERSATION ASSISTING DEVICE AND CONVERSATION ASSISTING METHOD

(76) Inventor: Takashi Yoshimine, 5-3-107, Minami-cho, Toda-shi, Saitama, 335-0025 (JP)

( * ) Notice: Subject to any disclaimer, the term of this patent is extended or adjusted under 35 U.S.C. 154(b) by 1086 days.

(21) Appl. No.: 10/567,548

(22) PCT Filed: May 12, 2004

(86) PCT No.: PCT/JP2004/006396

§ 371 (c)(1), (2), (4) Date: Feb. 8, 2006

(87) PCT Pub. No.: WO2005/109830

PCT Pub. Date: Nov. 17, 2005

(65) Prior Publication Data
US 2006/0204033 A1      Sep. 14, 2006

(51) Int. Cl.
*G09B 21/00*     (2006.01)
*G10L 15/26*     (2006.01)

(52) U.S. Cl. .................... 704/235; 704/271; 379/52

(58) Field of Classification Search ............... 704/270, 704/271, 235; 379/52; 382/114, 118
See application file for complete search history.

(56) References Cited

U.S. PATENT DOCUMENTS

| | | | | |
|---|---|---|---|---|
| 4,769,845 | A | * | 9/1988 | Nakamura .................. 704/231 |
| 5,047,952 | A | * | 9/1991 | Kramer et al. .............. 704/271 |
| 5,168,423 | A | * | 12/1992 | Ohgami et al. ......... 361/679.07 |
| 5,544,050 | A | * | 8/1996 | Abe et al. .................... 715/246 |
| 5,854,997 | A | * | 12/1998 | Sukeda et al. .................. 704/3 |
| 5,890,120 | A | * | 3/1999 | Haskell et al. .............. 704/271 |
| 5,982,853 | A | * | 11/1999 | Liebermann ................. 379/52 |
| 6,249,757 | B1 | * | 6/2001 | Cason ........................ 704/214 |
| 6,256,400 | B1 | * | 7/2001 | Takata et al. ................ 382/103 |
| 6,317,716 | B1 | * | 11/2001 | Braida et al. ................ 704/275 |
| 6,417,797 | B1 | * | 7/2002 | Cousins et al. .............. 342/179 |
| 6,460,056 | B1 | * | 10/2002 | Horii ......................... 715/203 |
| 6,477,239 | B1 | * | 11/2002 | Ohki et al. .................... 379/52 |

(Continued)

FOREIGN PATENT DOCUMENTS

JP          08-009254          1/1996

(Continued)

OTHER PUBLICATIONS

International Search Report mailed on Aug. 31, 2004.

(Continued)

*Primary Examiner*—Martin Lerner
(74) *Attorney, Agent, or Firm*—Rader, Fishman & Grauer, PLLC

(57) ABSTRACT

An object of the present invention is to provide a conversation support apparatus and a conversation support method that allow users to effectively and smoothly onverse with each other. According to the present invention, since a first display section 22 and a second display section 32 can be placed at different angles, while a first user is watching the second display section 32 and a second user is watching the first display section 22, they can smoothly converse with each other. Since the first display section 22 and the second display section 32 are disposed, for example the second user and the first user can face-to-face converse with each other.

9 Claims, 11 Drawing Sheets

U.S. PATENT DOCUMENTS

| | | | |
|---|---|---|---|
| 6,483,532 B1 * | 11/2002 | Girod | 348/14.12 |
| 6,993,474 B2 * | 1/2006 | Curry et al. | 704/3 |
| 7,076,429 B2 * | 7/2006 | Basson et al. | 704/272 |
| 7,110,951 B1 * | 9/2006 | Lemelson et al. | 704/270 |
| 7,277,858 B1 * | 10/2007 | Weaver et al. | 704/271 |
| 7,395,200 B2 * | 7/2008 | Roston | 704/3 |
| 2002/0140718 A1 * | 10/2002 | Yan et al. | 345/706 |
| 2002/0178344 A1 * | 11/2002 | Bourguet et al. | 712/1 |
| 2003/0223455 A1 * | 12/2003 | Rashdan | 370/466 |
| 2006/0234193 A1 * | 10/2006 | Sahashi | 434/112 |

FOREIGN PATENT DOCUMENTS

| | | |
|---|---|---|
| JP | 08-009254 A | 1/1996 |
| JP | 08-137385 A | 5/1996 |
| JP | 2002-366283 A | 12/2002 |
| JP | 2003-345379 A | 12/2003 |
| JP | 2004-015250 | 1/2004 |
| JP | 2004-015250 A | 1/2004 |

OTHER PUBLICATIONS

Japanese Office Action dated Apr. 14, 2009 for patent application No. 2006-516828.

* cited by examiner

40
| LIPS SHAPE PATTERNS | CONVERSION TABLE ID |
|---|---|
|  | 1 |
|  | 2 |
| 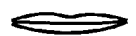 | 3 |
| ⋮ | ⋮ |
FIG.10
45
CONVERSION TABLE ID = 7
| LIPS PICTURE PATTERN | CHARACTER INFORMATION |
|---|---|
|  | A |
|  | I |
|  | U |
| ⋮ | ⋮ |
FIG.11

CONVERSATION ASSISTING DEVICE AND CONVERSATION ASSISTING METHOD

FIELD OF THE INVENTION

The present invention relates to a conversation support apparatus and a conversation support method that support conversation between users for example a non-impaired person and an impaired person.

BACKGROUND OF THE INVENTION

Technology of supporting conversation between the user and an impaired person or a foreigner has been proposed. Technology that analyzes a moving picture of lips of talker captured by a video camera, converts the moving picture into character information and sound information, and outputs them to a display section, a speaker, and so forth has been disclosed (for example, refer to paragraph [0017], FIG. 1 of Japanese Patent Laid-Open Publication No. 2004-15250).

In addition, technology of translating the language that a talking user is talking into a predetermined language and displays character strings of the translated language on a monitor or the like has been disclosed (for example, refer to paragraph [0013], FIG. 1 of Japanese Patent Laid-Open Publication No. 2003-345379).

DISCLOSURE OF INVENTION

Problems to be Solved

When a talking user face-to-face talks to a listener with for example the apparatus disclosed in the patent document 1, it is preferred that a picture process, a sound process, and so forth thereof be effectively performed. In particular, the patent document 1 does not specifically describe a method of a lip-reading process. Thus, the apparatus of the patent document 1 cannot be accomplished without a proper modification.

In the apparatus of the patent document 1, when the talking user presses a picture analysis control key of the apparatus, a camera becomes active. After the camera becomes active, the picture analysis process starts. Thus, whenever the talking user talks, he or she needs to inconveniently press the control key.

From the above described point of view, an object of the present invention is to provide a conversation support apparatus and a conversation support method that allows the users to effectively and smoothly converse with each other.

Means for Solving the Problem

To accomplish the foregoing object, the present invention is a conversation support apparatus, comprising picture capture means for capturing pictures of a first user and a second user; first conversion means for converting first picture information of the first user, whose picture has been captured, into first information that the second user is capable of perceiving; second conversion means for converting second picture information of the second user, whose picture has been captured, into second information that the first user is capable of perceiving; first display means, having a first display screen, for displaying the first information, which has been converted, on the first display screen; and second display means, having a second display screen capable of being placed at an angle different from the angle of the first display screen, for displaying the second information, which has been converted, on the second display screen.

Since the first display screen and the second display screen can be placed at different angles, while the first user is watching the second display screen and the second user is watching the first display screen, they can effectively and smoothly converse with each other. In addition, since both the first display screen and the second display screen are displayed, the second user and the first user can face-to-face converse with each other.

According to the present invention, the first user is a non-impaired person or a hearing impaired person. When the first user is an non-impaired person, the second user is a hearing impaired person. In contrast, when the first user is a hearing impaired person, the second user is a non-impaired person or a hearing impaired person.

The conversation support apparatus according to the present invention can support conversation between foreigners. In this case, when the first user is a person who talks a first language, the second user is a person who talks a second language that is different from the first language.

According to an embodiment of the present invention, the conversation support apparatus further comprises sound collection means for collecting sound of the first user; and third conversion means for converting the collected sound into the first information. Thus, when the user can talk, sound information of the talking user can be converted into the first information without need to use the captured picture information. Instead, both the picture analysis process and the sound analysis process may be performed simultaneously. Thus, the recognition accuracy of the contents that the first user intends to converse with the second user can be improved. According to the present invention, means for collecting the sound of the second user may be provided.

According to the present invention, means for correlatively storing the collected sound pattern of the first user and the first information pattern may be provided. Thus, by analyzing the sound information, deciding the sound pattern, and extracting the first information pattern corresponding to the sound pattern, third conversion means can perform the conversion process. The sound of the second user can be processed in the same manner.

According to an embodiment of the present invention, the first conversion means converts the first picture information into one of character information and sign information as the first information. Thus, when the second user is a hearing impaired person, he or she can communicate with the first user through the first display screen that displays character information and sign information that the second user watches. Likewise, the second conversion means may have means for converting the picture information of the second user as the second information into one of the character information and the sign information. Thus, the first user may be a hearing impaired person. Even if both the users are hearing impaired people, they can effectively converse with each other.

According to an embodiment of the present invention, the first conversion means converts the first picture information into sound information as the first information. The conversation support apparatus further comprises output means for outputting the converted sound information. Thus, when the first user is a non-impaired person or even if he or she is a hearing impaired person, he or she and a visually impaired person (second user) can converse with each other. Likewise, the second conversion means may have means for converting the picture information of the second user into the sound information as the second information. The conversation support apparatus may also have means for outputting the converted sound information.

According to an embodiment of the present invention, the first display means displays the second information on the first display screen. Thus, the second user himself or herself can check the second information on the first display screen. For example, the second user can check whether there are conversion errors of the second conversion means. In addition, the second display means may display the first information on the second display screen. In particular, according to an embodiment of the present invention, when the first display means displays the second information nearly in synchronization with timing the second display means displays the second information, the users can smoothly converse with each other.

According to an embodiment of the present invention, when the first conversion means converts the first picture information into character information and sign information, the first display means displays the sign information, which has been converted by the first conversion means, on the first display screen. The second display means displays the character information, which has been converted by the first conversion means, nearly in synchronization with timing the first display means displays the sign information. According to the present invention, the contents that the first user intends to converse with the second user are displayed as sign information on the first display screen that the second user watches and as character information on the second display screen that the first user watches. Thus, the first user can check the contents that he or she intends to converse with the second user while he or she is watching the second display screen. In particular, the first user can check whether the contents contain conversion errors or the like.

According to an embodiment of the present invention, the conversation support apparatus further comprises measurement means for measuring a sound pressure level or a noise level of sound of the first user; setting means for setting a threshold value of the sound pressure level or the noise level; and execution means for causing the third conversion means to execute a conversion process when the measured sound pressure level or noise level is equal to or larger than the threshold value. Thus, when the first user starts talking to the second user in a sound pressure level or noise level higher than a predetermined threshold value, the sound recognition can automatically start. Thus, unlike the related art, it is not necessary for the users to press the picture analysis and sound recognition control key or the like. Thus, the users can smoothly converse with each other. In addition, according to the present invention, instead of or in addition to the third conversion means, the conversion process of the first conversion means may be executed.

According to an embodiment of the present invention, the conversation support apparatus further comprises storage means for correlatively storing a plurality of picture patterns of lips of a person who pronounces sound and character information corresponding to sound that the person pronounces. The picture capture means captures a picture of the lips of the first user as the first picture information. The first conversion means has picture pattern comparison means for comparing the captured picture information and each of the picture patterns, picture pattern selection means for selecting one picture pattern corresponding to the captured lip picture information from the picture patterns corresponding to the compared result, and character information extraction means for extracting the character information corresponding to the selected picture pattern. The person may be the first user himself or herself or another user different from the first user. Instead, the person may not be the second person. This applies to the following description. According to the present invention, the first conversion means selects a picture pattern corresponding to lip picture information captured by so-called the pattern matching. Of course, the second conversion means may have means similar to the first conversion means.

According to an embodiment of the present invention, the storage means correlatively stores the picture patterns of each of the plurality of people and the character information and stores lips shape patterns of each of the plurality of people. The conversation support apparatus further comprises shape pattern comparison means for comparing the captured lip picture information and the shape patterns, and shape pattern selection means for selecting a shape pattern that is the most similar to the captured lip picture information from the shape patterns corresponding to the compared result. According to the present invention, when one shape pattern that is the most similar to the lip picture information has been selected, the first and second user start conversing with each other. Based on the selected shape pattern, the pattern matching can be performed. Thus, the pictures of the users can be more accurately recognized. In addition, the conversion process can be more accurately performed. Thus, the occurrence rate of conversion errors and so forth of the conversion process can be decreased.

According to an embodiment of the present invention, the conversation support apparatus further comprises storage means for correlatively storing a plurality of picture patterns of lips of a human who pronounces sound and sign information corresponding to sound that the human pronounces. The picture capture means captures a picture of the lips of the first user as the first picture information. The first conversion means has picture pattern comparison means for comparing information of the captured picture of the lips of the first user and the picture patterns; picture pattern selection means for selecting one picture pattern corresponding to the information of the captured picture of the lips of the first user from the picture patterns corresponding to the compared result; and sign information extracting means for extracting the sign information corresponding to the selected picture pattern. Of course, the second conversion means may have the same means as the first conversion means. In addition, according to the present invention the storage means may correlatively store the picture patterns of each of the plurality of people and the sign information and stores lips shape patterns of each of the plurality of people. The conversation support apparatus may further comprise shape pattern comparison means for comparing the information of the captured picture of the lips of the first user and the shape patterns; and shape pattern selection means for selecting one shape pattern that is the most similar to the information of the captured picture of the lips of the first user from the shape patterns corresponding to the compared result.

According to an embodiment of the present invention, the conversation support apparatus further comprises storage means for correlatively storing a plurality of lips picture patterns of a person who pronounces sound and character information corresponding to sound that the person pronounces. The picture capture means captures a picture of the lips of the first user as the first picture information. The first conversion means has picture pattern comparison means for comparing the information of the captured picture of the lips of the first user and the picture patterns, picture pattern selection means for selecting one picture pattern corresponding to the information of the captured picture of the lips of the first user from the picture patterns corresponding to the compared result, and sound information extraction means for extracting the sound information corresponding to the selected picture pattern. Of course, the second conversion means may have the same means as the first conversion means. In addition, according to the present invention, the storage means may correlatively store the picture patterns of each of the plurality of people and the sign information and stores lips shape patterns of each of the plurality of people. The conversation support apparatus may further comprise shape pattern comparison means for comparing the captured lip picture information and the shape patterns, and shape pattern selection means for selecting a shape pattern that is the most similar to the captured lip picture information from the shape patterns corresponding to the compared result.

According to an embodiment of the present invention, the first display means has a first portion that has a first end portion and in which the first display screen is disposed. The second display means has a second portion that has a second end portion and in which second display screen is placed, the first end portion and the second end portion being connected so that the second display screen is capable of being twisted against the first display screen and the second display screen is capable of being folded to the first portion. Thus, the positions of the first user and the second user are not restricted.

According to an embodiment of the present invention, the conversation support apparatus further comprises storage means for storing the first information; reproduction means for reproducing the first information stored in the storage means on the first display screen; and trick play means for performing a trick play operation for the stored first information. The trick play includes for example fast forward operation, rewind operation, slow reproduction operation, double speed reproduction operation, and so forth. The trick play is a display operation different from the normal picture reproduction. With the trick play, the second user can reproduce missed information for example by rewinding recorded information. In addition, the conversation support apparatus may further comprise means for storing second information and means for performing the trick play operation for the stored second information to cause the second display means to perform the trick play for the first information.

The present invention is a conversation support method, comprising the steps of capturing a picture of a first user and a picture of a second user; converting first picture information of the captured picture of the first user into first information that the second user is capable of perceiving; converting second picture information of the captured picture of the second user into second information that the first user is capable of perceiving; displaying the converted first information on the first display screen; and displaying the converted second information on the second display screen that is capable of being placed at an angle different from that on the first display screen.

According to the present invention, since the first display screen and the second display screen can be placed at different angles, while the first user is watching the second display screen and the second user is watching the first display screen, they can smoothly converse with each other.

Effects of the Invention

As described above, according to the present invention, the users can smoothly converse with each other.

BRIEF DESCRIPTION OF THE DRAWINGS

FIG. 10 is a schematic diagram showing a table that correlates lips patterns of a plurality of people and their conversion table IDs;

FIG. 11 is a schematic diagram showing a conversion table;

BEST MODE FOR CARRYING OUT THE INVENTION

Next, with reference to the accompanying drawings, embodiments of the present invention will be described.

Figure 1:
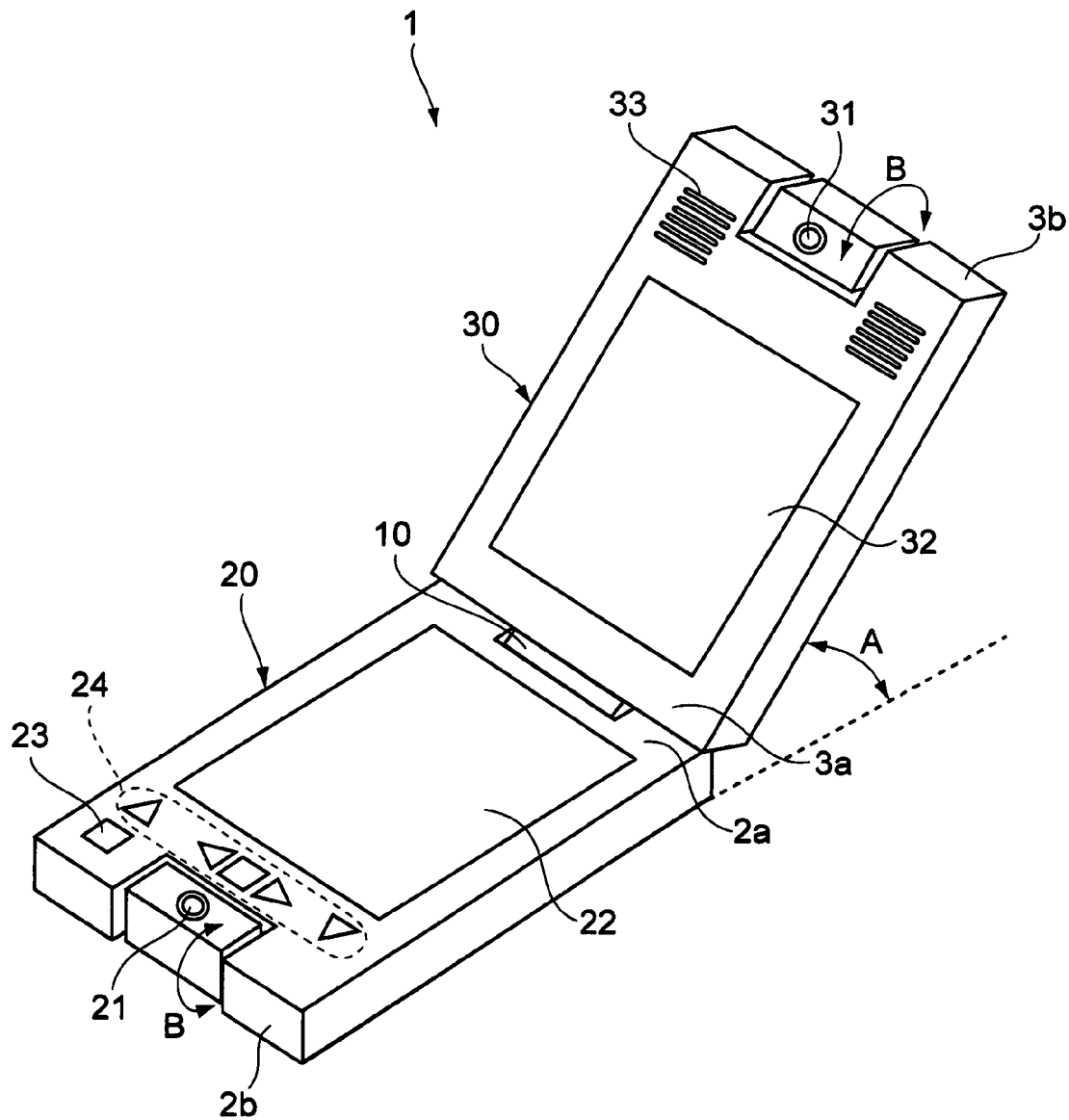
FIG. 1 is a perspective view showing a conversation support apparatus according to an embodiment of the present invention.
Figure 2:
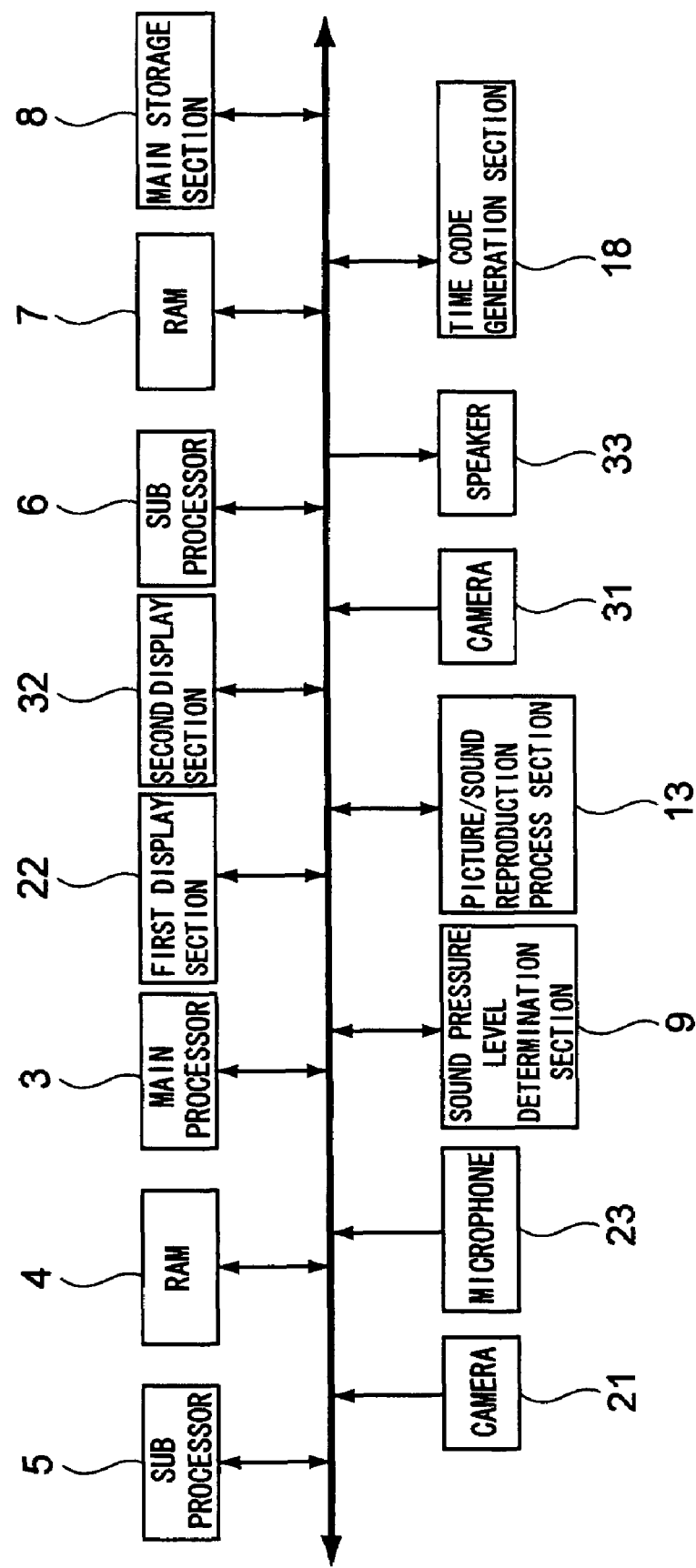
FIG. 2 is a block diagram showing the structure of the conversation support apparatus.

FIG. 1 is a perspective view showing a conversation support apparatus according to a first embodiment of the present invention. FIG. 2 is a block diagram showing the structure of the conversation support apparatus designated by reference numeral 1.

The conversation support apparatus 1 is composed of a first main body 20 and a second main body 30. The conversation support apparatus 1 is nearly the size of for example a personal digital assistance (PDA). The first main body 20 has a first display section 22. Likewise, the second main body 30 has a second display section 32. The first display section 22 is composed of for example liquid crystal or organic electroluminescence (EL). The second display section 32 has the same structure as the first display section 22. Disposed at one end portion 2b of the first main body 20 and at one end portion 3b of the second main body 30 are cameras 21 and 31, respectively. The cameras 21 and 31 can be rotated in the direction of arrow B so that their picture capturing ranges can be adjusted. The cameras 21 and 31 have a function that can capture a moving picture. The first main body 20 has an operation button group 24. When the user presses for example a "record" button, the conversation support apparatus 1 stores pictures captured by the camera 21 and so forth.

The conversation support apparatus 1 has a main processor 3, sub processors 5 and 6, random access memories (RAMs) 4 and 7, a main storage section 8, a microphone 23, a sound pressure level determination section 9, a picture/sound reproduction process section 13, a speaker 33, and a time code generation section 18.

The main processor 3 controls the whole conversation support apparatus 1. In addition, the main processor 3 perform a schedule management of data processes for the sub processors 5 and 6. The sub processor 5 performs a data process for the first main body 20. The sub processor 6 performs a data process for the second main body 30. The sub processors 5 and 6 can independently perform data processes. The RAM 4 is a work area of for example the main processor 3 and the sub processor 5. The RAM 7 is a work area of the sub processor 6.

Picture frames captured by the cameras 21 and 31 are assigned camera IDs that identify pictures captured by the cameras 21 and 31. In addition, captured picture frames are uniquely assigned sequence numbers in the chronological order. Moreover, the captured picture frames are time-stamped with time codes. The time codes are generated by the time code generation section 18. As a result, the main processor 3, and the sub processors 5 and 6 can recognize by which camera the acquired picture frames were captured. In addition, they can recognize the captured order and captured times of picture frames. Moreover, the frame rates of picture frames captured by the cameras 21 and 31 can be for example 5 to 20 frames/second.

Likewise, sound information collected by a microphone is time-stamped with time codes at intervals of for example a predetermined time period. In this case, it is preferred that the predetermined time period be matched with the frame rate.

Figure 3:
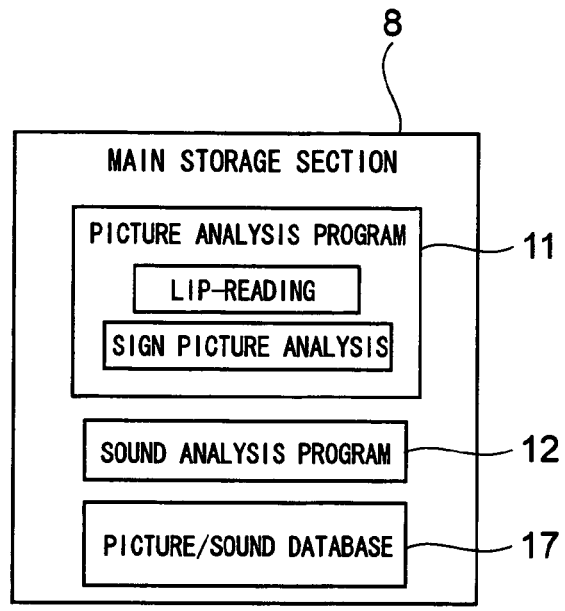
FIG. 3 is a schematic diagram showing software stored in a main storage section 8.

FIG. 3 is a schematic diagram showing software stored in the main storage section 8. The main storage section 8 may be composed of for example a hard disk, a semiconductor memory, or the like. The main storage section 8 stores a picture analysis program 11, a sound analysis program 12, and a picture/sound database 17. The picture analysis program 11 has a lip-reading function, which analyzes a picture of the user in particular the motion of the lips of the user captured by the camera 21 into character information or sound information, a sign picture analysis function, which analyzes a sign picture that for example the user signed and the camera 31 captured and converts the picture into character information or sound information, and other functions. The second main body 30 displays the character information into which picture information captured by the camera 21 was converted. The first main body 20 displays character information into which sign picture information captured by the camera 31 was converted. The picture analysis program 11 converts a user's picture into character information and sign information. In addition, the picture analysis program 11 converts a sign picture into sound information.

The sound analysis program 12 is a program that analyzes user's sound collected by the microphone 23 and converts the collected sound into character information. The second main body 30 displays the converted character information. The sound analysis program 12 can convert the sound into character information and sign information.

Figure 4:
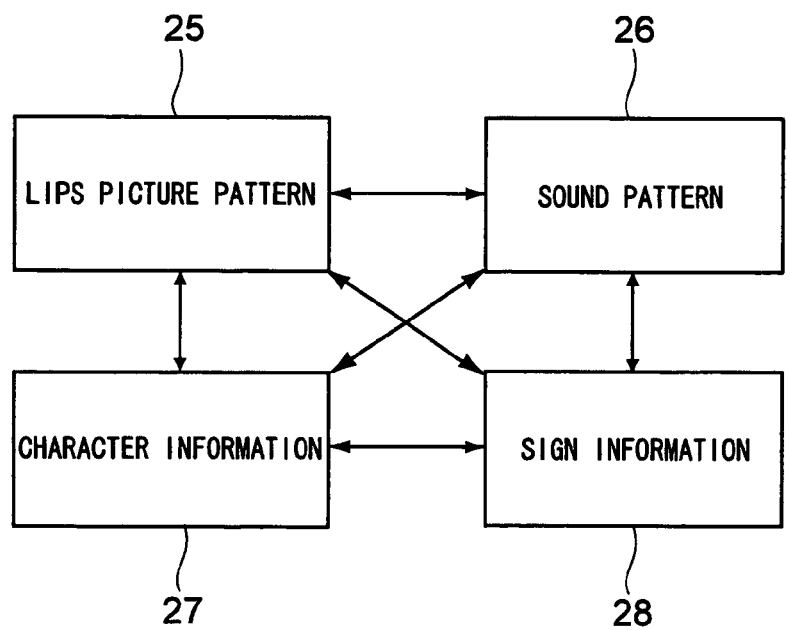
FIG. 4 is a schematic diagram showing an example of a picture/sound database.

FIG. 4 is a schematic diagram showing an example of the pre-stored picture/sound database 17. Specifically, the picture/sound database 17 is a table that correlates a person's lips picture pattern 25, a sound pattern 26, character information 27, and sign information 28.

The lips picture pattern 25 is a picture of lips and their vicinity of a person who is pronouncing for example "A (in Japanese)". Since not only a picture of lips, but a picture in their vicinity, for example information of wrinkles around the lips is used, the accuracy of picture recognition is more improved. Wrinkles that occur when a person pronounces "E (in Japanese)" are different from those that occur when he or she pronounces "I (in Japanese)". It is preferred that the lips picture pattern 25 be stored as a word rather than a character.

The sound pattern 26 is sound characteristics of a word, a phrase, or a sentence that a person pronounces. The sound characteristics are for example a frequency, a sound pressure, a time interval between words, a total time interval between phrases or sentences.

The character information 27 is for example text information. The sign information 28 is a pattern of a sign picture. A picture sign pattern of each finger character or each sign word is stored.

Figure 5:
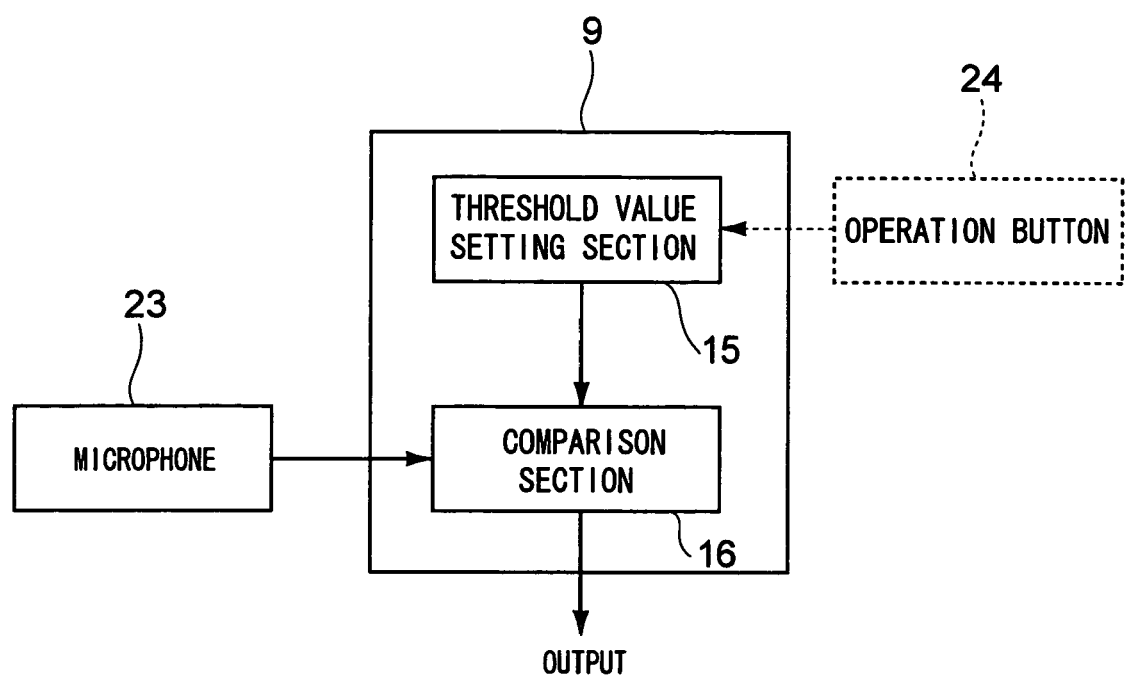
FIG. 5 is a block diagram showing the structure of a sound pressure level determination section.

FIG. 5 is a block diagram showing the structure of the sound pressure level determination section 9 shown in FIG. 2. The sound pressure level determination section 9 has a threshold value setting section 15 and a comparison section 16. The sound pressure level determination section 9 has a function that starts analyzing a picture captured by the camera 21 and so forth for example when the comparison section 16 has determined that the sound pressure of sound that the user pronounces in front of the microphone 23 exceeds a threshold value that has been set in the threshold value setting section 15. In this case, with the operation button 24, the user may be able to set the threshold value. Instead, the sound pressure level determination section 9 may start analyzing pictures with the noise level rather than the sound pressure level.

Figure 6:
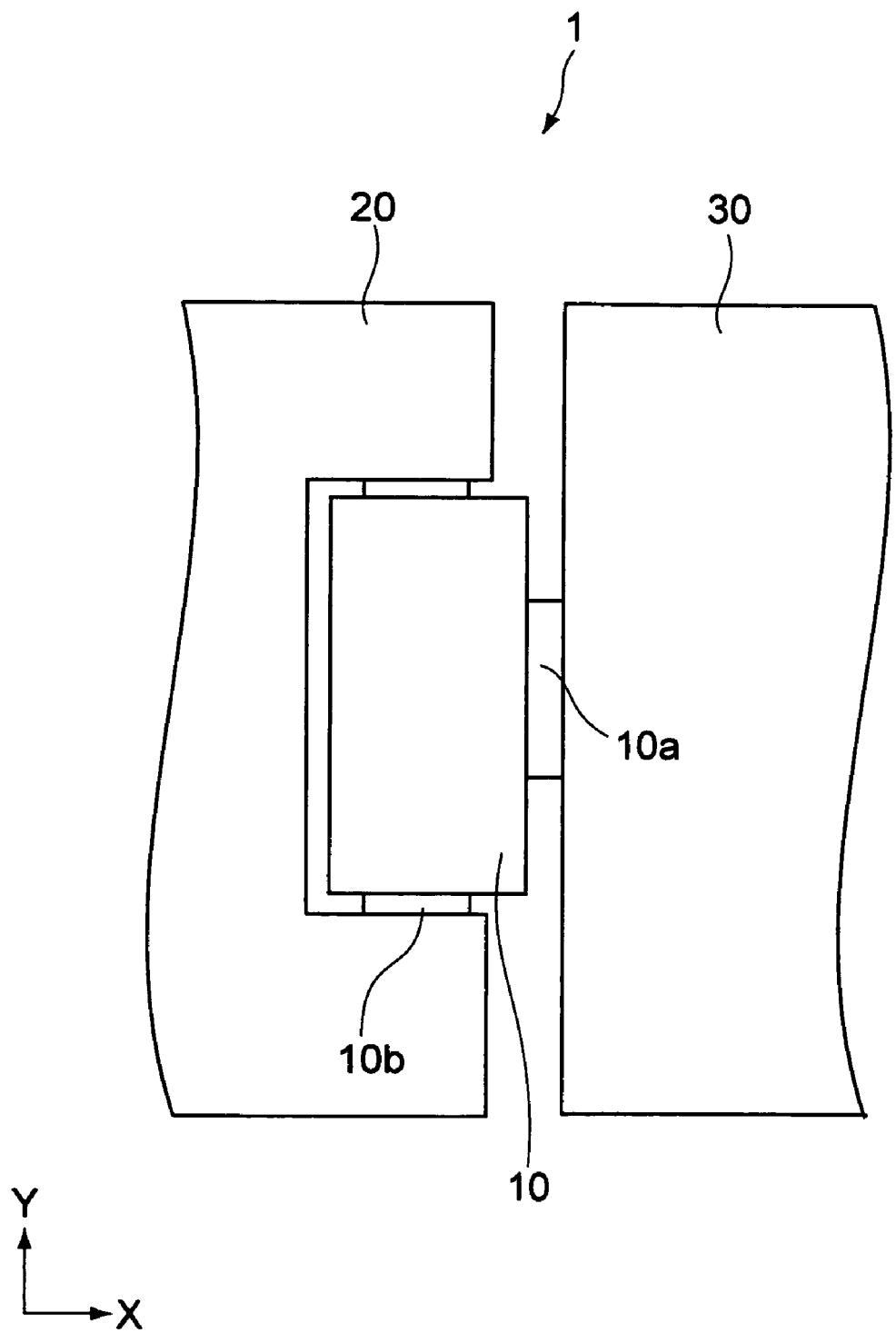
FIG. 6 is an enlarged view showing a connection portion of a first main body and a second main body.

FIG. 6 is an enlarged view showing a connection portion that connects the first main body 20 and the second main body 30. The first main body 20 and the second main body 30 are connected at other end portions 2a and 3b with a connection mechanism 10. The connection mechanism 10 has shaft portions 10a and 10b. The shaft portion 10b allows the first main body 20 and the second main body 30 to be folded in direction A as shown in FIG. 1. The first main body 20 and the second main body 30 can be folded at angles of which the display screen of the first display section 22 and the display screen of the second display section 32 face to each other and the rear surface of the first display section 22 and the rear surface of the second display section 32 face to each other. In other words, the first main body 20 and the second main body 30 are connected with the connection mechanism 10 so that angle A becomes 360 degrees. In addition, the shaft portion 10a allows the display screen of the second display section 32 to be twisted against the display screen of the first display section 22. In other words, the first main body 20 and the second main body 30 are rotated around axis X. One display section is rotated against the other display section by for example 270 degrees. Since these display sections can be folded and twisted, the apparatus can be used regardless of the positions of two people who converse with each other. For example, two people can talk to each other even if they face to each other or they stand side by side.

Figure 7:
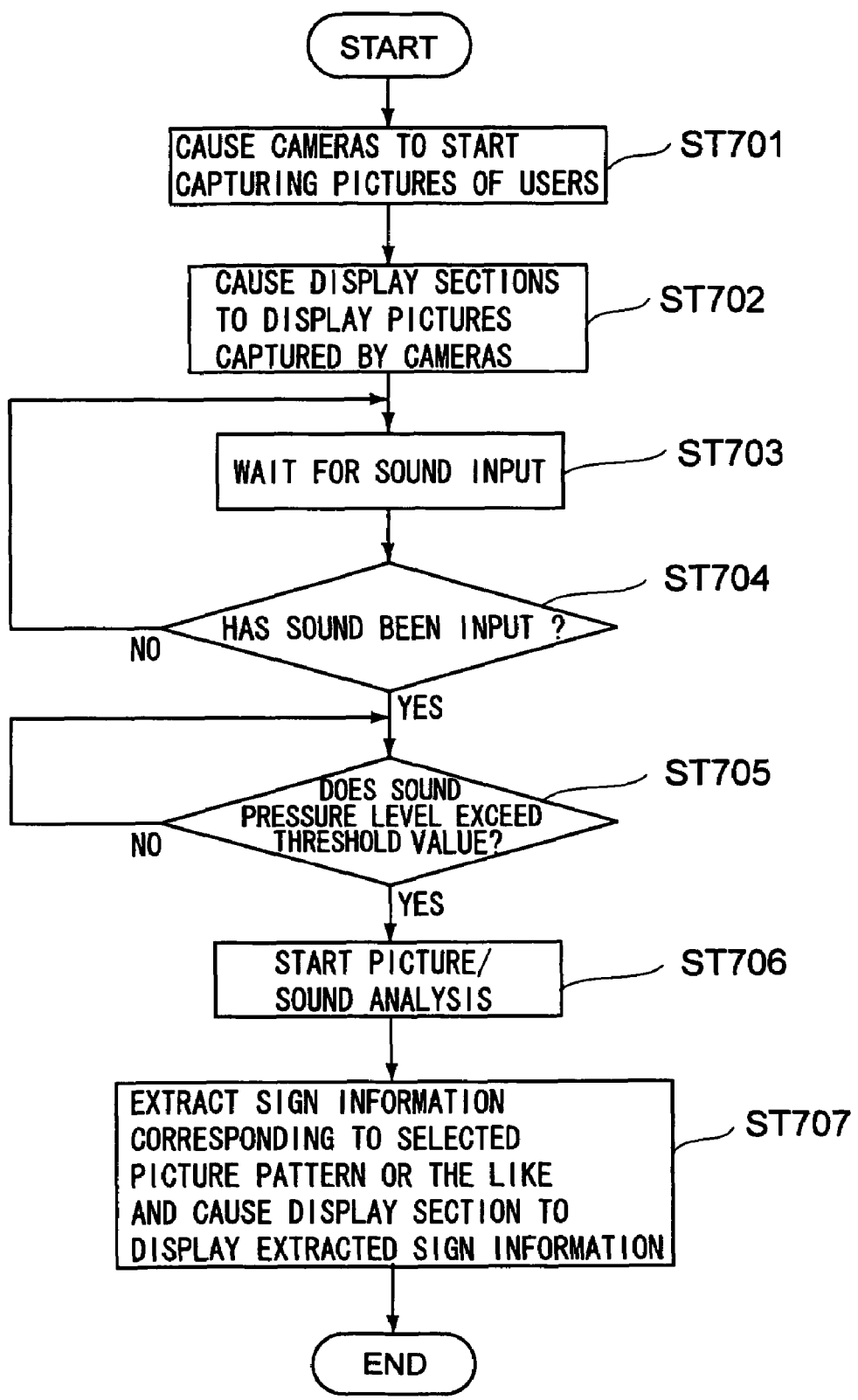
FIG. 7 is a flow chart showing the operation of the conversation support apparatus.

Next, the operation of the conversation support apparatus 1 will be described. FIG. 7 is a flow chart showing the operation of the conversation support apparatus 1.

Next, the case that for example a non-impaired person and a hearing impaired person talk to each other will be described. While the non-impaired person is watching the first display section 22, he or she talks to the hearing impaired person. While the hearing impaired person is watching the second display section 32, he or she talks to the non-impaired person.

When a power switch (not shown) of the conversation support apparatus 1 is turned on, the camera 21 starts capturing a picture of the non-impaired person. In addition, the camera 31 starts capturing a picture of the hearing impaired person (at step 701). In this case, moving pictures can be captured and stored in the RAM 4 and so forth for a predetermined time period or a predetermined storage capacity. Picture frames stored in the RAM 4 and so forth may be erased in the order of the oldest picture frame. Instead, picture frames may be successively stored in the main storage section 8.

When the cameras 21 and 31 start capturing pictures, the main processor 3, the sub processor 5, and so forth display the pictures captured by the cameras 21 and 31 on the second display section 32 and the first display section 22, respectively, in real time (at step 702). In this case, the sub processor 5 may be in charge of the second display section 32 under the control of the main processor 3. On the other hand, the sub processor 6 may be in charge of the first display section 22 under the control of the main processor 3.

When the cameras 21 and 31 start capturing pictures, the conversation support apparatus 1 waits until sound of the non-impaired person or the hearing impaired person is input (at step 703). When the sound is input (namely, the determined result at step 704 is YES), the sound pressure level determination section 9 determines whether the sound pressure level of the input sound is equal to or larger than the threshold value (at step 705). When the sound pressure level of the input sound is equal to or larger than the threshold value, the main processor 3 starts an analysis process for the pictures captured by the camera 21 and so forth and an analysis process for sound collected by the microphone 23 according to the picture analysis program 11 and the sound analysis program 12, respectively (at step 706). In this case, the sub processors 5 and 6 share these processes according to an analysis process command issued by the main processor 3. In this case, for example the sub processor 5 may perform the analysis process for the pictures, whereas for example the sub processor 6 may perform the analysis process for the sound.

After having performed the analysis processes, the main processor 3 and so forth keep the YES state of step 705 for a predetermined time period. In other words, even if the non-impaired person stops talking, the main processor 3 and so forth keep the YES state of step 705. The predetermined time period is for example one second or around several seconds.

Figure 8:
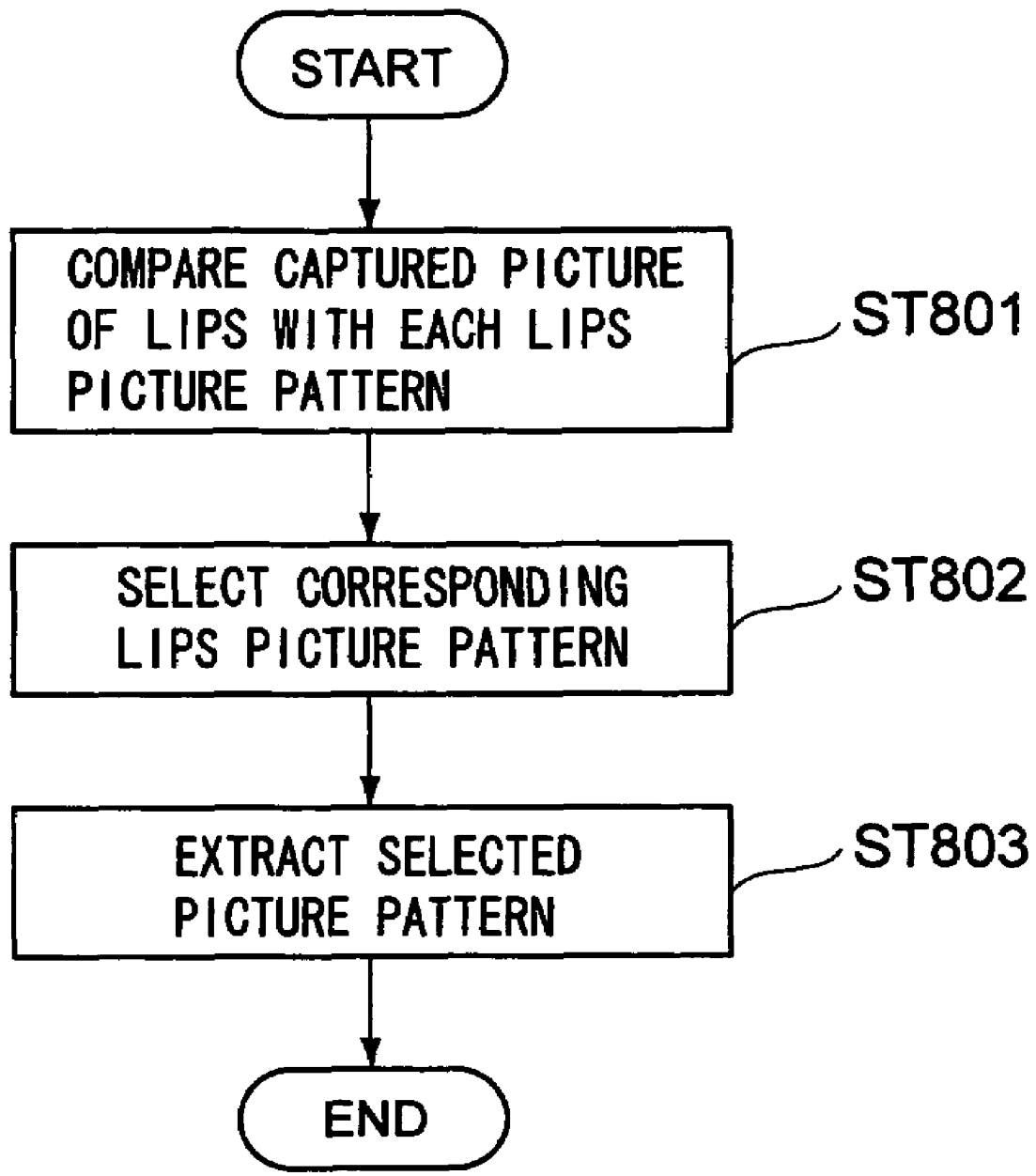
FIG. 8 is a flow chart showing a picture analysis process at step 706 shown in FIG. 7.

The picture analysis program 11 analyzes a picture of the lips of particularly the non-impaired person. Specifically, since the mouth of a person is located at a lower portion of the face, when the conversation support apparatus 1 recognizes the position of the mouth, by scanning the entire face of the non-impaired person and extracting the contour of the face, the conversation support apparatus 1 can detect the position of the lips. FIG. 8 is a flow chart of the picture analysis process. The main processor 3 and so forth frequently compare a picture of the lips of the non-impaired person that the camera 21 captures and each lips picture pattern 25 stored in the main storage section 8 (at step 801). The main processor 3 and so forth select a corresponding lips picture pattern (at step 802) and extracts the selected picture pattern (at step 803).

Specifically, a picture is analyzed with a matrix of white-black binary values. More specifically, a picture frame of which the number of matched pixels is the maximum may be treated as a lips picture pattern corresponding to the captured picture of the lips. Since only the shapes of lips and hands (a picture of hands is captured when a sign picture is analyzed) need to be recognized, binary data are sufficient. Thus, the storage capacities of the main storage section 8, the RAM 4, and the so forth can be reduced.

Figure 9:
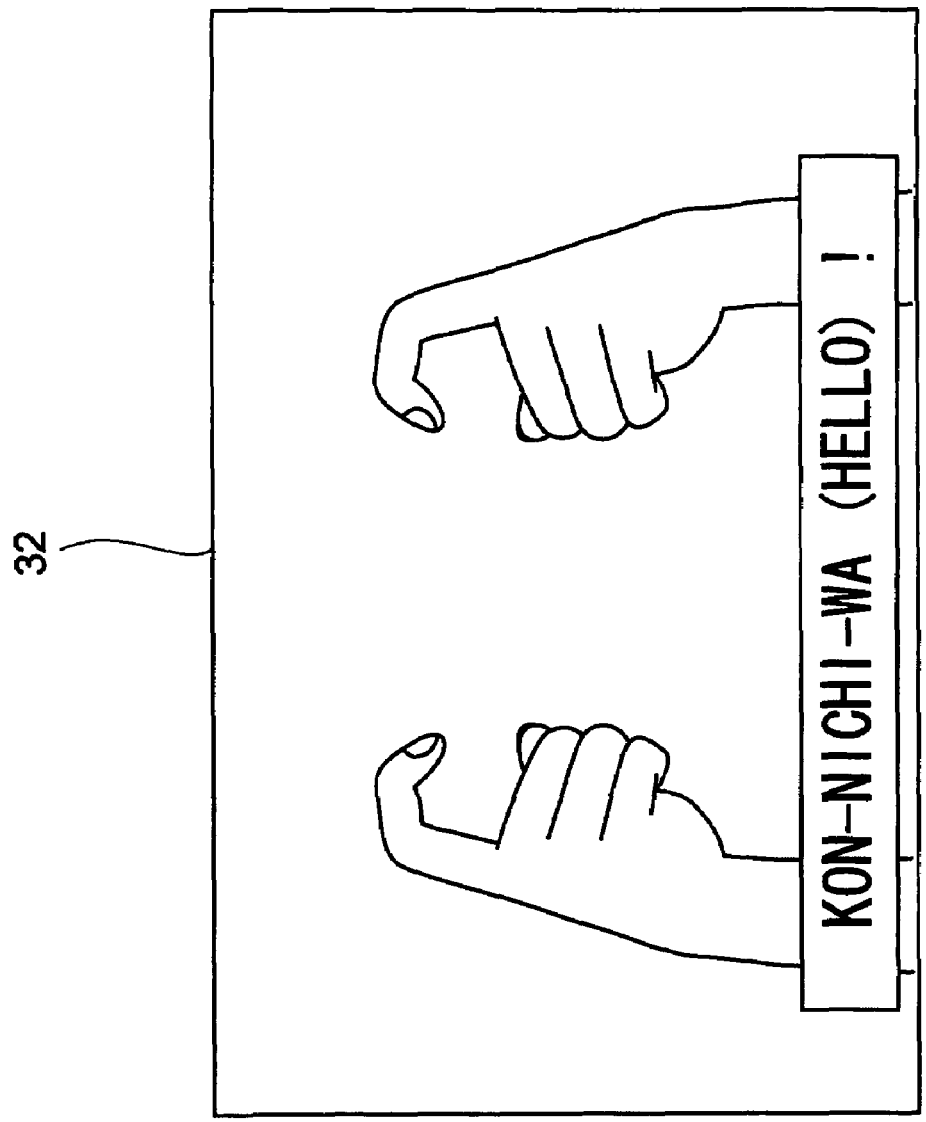
FIG. 9 is a schematic diagram showing an example of a picture that has been converted and that is displayed on a second display section 32.

The sub processor 5 and so forth extract the sign information 28 corresponding to the extracted picture pattern and displays the sign information 28 on the second display section 32 (at step 707). FIG. 9 shows an example of a picture displayed on the second display section 32. In this example, information "KON-NICHI-WA (Hello in Japanese) !" is displayed as a sign picture. In addition, the sub processor 5 and so forth may extract character information 27 corresponding to the extracted picture pattern and display the character information 27 on the second display section 32 as illustrated in the drawing. The hearing impaired person can understand the contents, by watching the character information 27 displayed on the second display section 32.

The sound analysis program 12 analyzes sound that the non-impaired person pronounces. Specifically, the sound analysis program 12 always compares the sound information collected by the microphone 23 and each sound pattern 26 stored in the main storage section 8. The sound analysis program 12 selects a corresponding sound pattern 26 and extracts the selected sound pattern. This sound analysis process is preformed by for example Hidden Markov Model. The sound analysis program 12 extracts sign information or character information corresponding to the extracted sound pattern and displays the extracted information on the second display section 32. In addition, in the sound analysis process, noise is removed from the extracted sound and distortion of the sound is corrected.

At step 802, a process is performed in synchronization with the sound analysis process that the sound analysis program 12 performs. Specifically, sound data of a portion assigned the same time code as the extracted picture frame are analyzed. It is determined whether sign information extracted at step 707 by the picture analysis process matches the sign information extracted at step 707 by the sound analysis process. When they do not match, the picture analysis process and the sound analysis process are performed once again. Instead, since the recognition rate of sound recognition is higher than that of picture recognition, the result extracted by the sound analysis process may be prioritized over the picture recognition process. Since analysis processes for pictures and sound are performed in such a manner, the recognition accuracy of the contents about which the non-impaired person talks improves.

At step 707, the sub processor 6 and so forth may display sign information or character information on the first display section 22 nearly in synchronization with the extracted sign information or character information that the sub processor 5 displays on the second display section 32. Thus, while the non-impaired person is watching the first display section 22, he or she can check whether the contents about which he or she talked contains a conversion error or the like.

On the other hand, when the hearing impaired person talks, the sub processor 6 and so forth perform an analysis process for a picture of a sign that he or she used and that the camera 31 captured and extracts sign information corresponding to the picture of the sign and a sound pattern 26 corresponding to the sign information. The sub processor 6 and so forth convert the sound pattern 26 into sound information and outputs it to the speaker 33. Instead, the sub processor 6 and so forth extract character information 27 corresponding to the extracted sign information 28 and display it on the first display section 22.

As described above, according to the embodiment, while the non-impaired person is watching the first display section 22 and the hearing impaired person is watching the second display section 32, they can converse with each other. Thus, they can effectively and smoothly converse with each other.

According to the embodiment, since the conversation support apparatus 1 is provided with the sound pressure level determination section 9, unlike the related art, it is not necessary for the user to press the picture analysis control key and the sound recognition control key whenever they starts talking. Thus, the users can smoothly converse with each other.

Next, another embodiment of the present invention will be described. The description of sections, functions, and operations of a conversation support apparatus of this embodiment that are similar to those of the conversation support apparatus 1 of the foregoing embodiment will be briefly made or omitted except for different points.

FIG. 10 shows a table that correlates lips shape patterns of a plurality of people and their conversion table IDs. This table designated by reference numeral 40 may be stored in for example the main storage section 8 (refer to FIG. 2). FIG. 11 shows a conversion table designated by reference numeral 45. Likewise, the conversion table 45 correlates the lips picture patterns 25 shown in FIG. 4 and character information 27. The conversion table 45 is a conversion table dedicated for one of a plurality of people (for example, conversion table ID=7). FIG. 11 shows the relationship between lips picture patterns and characters. Instead, as shown in FIG. 4, the conversion table 45 may correlate lips picture patterns 25 and words, phrases, or sentences. The plurality of people may be for example five people, ten people, 20 people, or more people.

The lips shape patterns shown in FIG. 10 may be stored as for example pre-captured default patterns. Instead, lips shape patterns collected by the user may be stored. Lips shape patterns may be patterns of which the mouth is closed (silence state) or patterns of which a particular word such as "A" or a particular sentence such as "KON-NICHI-WA" is being pronounced. When the word "A" is pronounced, its lips shape pattern is a still picture. When the sentence "KON-NICHI-WA" is pronounced, its lips shape pattern is a moving picture.

Figure 12:
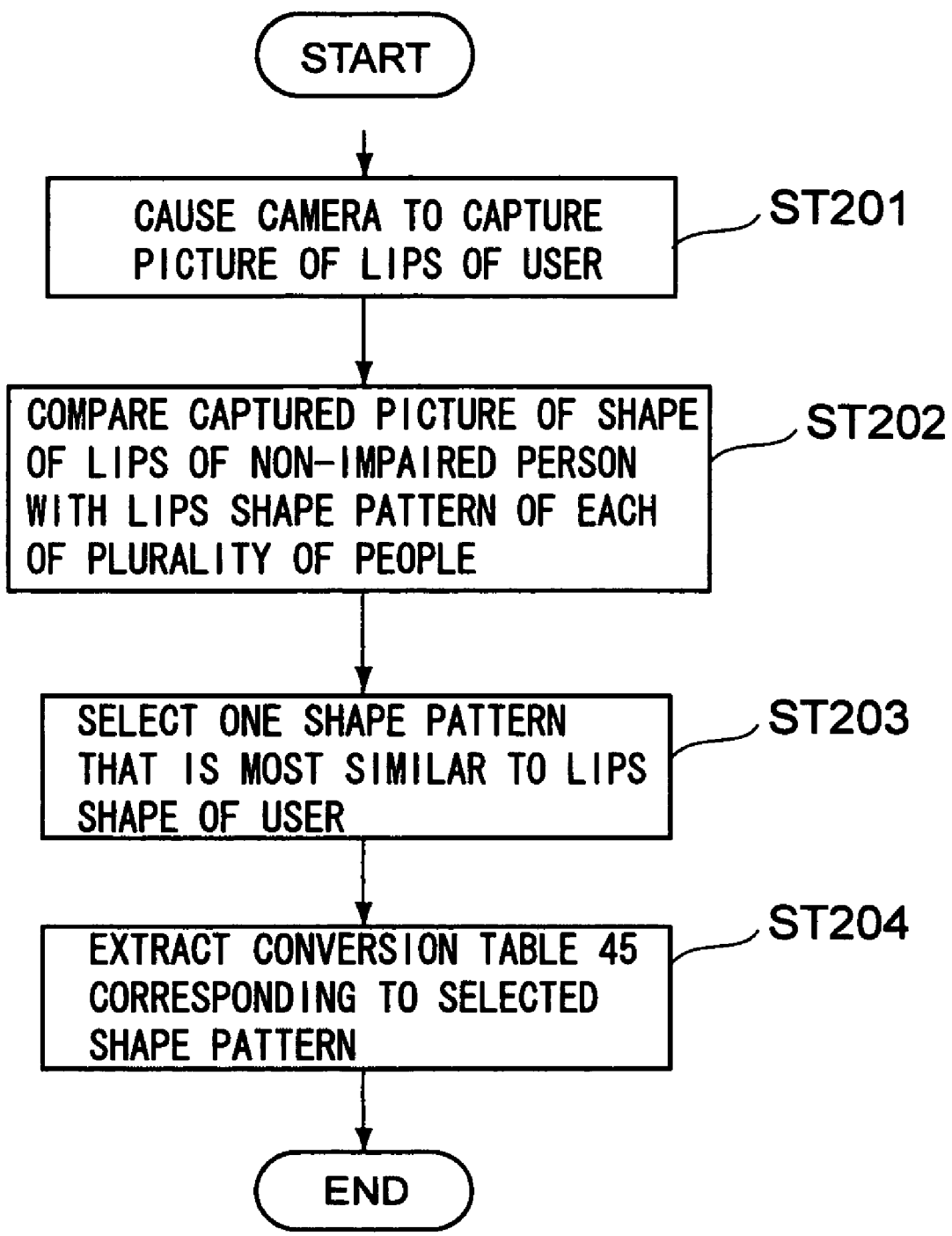
FIG. 12 is a flow chart showing a part (initial setting) of an operation of a conversation support apparatus according to another embodiment of the present invention.

FIG. 12 is a flow chart showing a part of the operation of the conversation support apparatus according to this embodiment of the present invention.

Before conversation is started with the conversation support apparatus, an initial setting is performed. The operation of the initial setting will be described with reference to FIG. 12. When people who converse with each other are a non-impaired person and a hearing impaired person, a picture of the lips of the non-impaired person are captured by the camera 21 or the like (at step 201). In this case, the operation button group 24 may have an "initial setting" button. When the non-impaired person presses the initial setting button, the initial setting may be started. Instead, a picture of the state of which the non-impaired person closes his or her mouth (silence state) may be captured by the camera 21. Instead, a picture of which the non-impaired person is pronouncing a particular word "A" or a particular sentence "KON-NICHI-WA (Hello in Japanese) !" may be captured by the camera 21.

The main processor 3, the sub processor 5, the sub processor 6, and so forth store the captured picture of the lips of the non-impaired person to the RAM 4 or the like. The main processor 3 and so forth compare the shape of the lips of the non-impaired person with the lips shape pattern of each of the plurality of people stored in the main storage section 8 according to the picture analysis program 11 (at step 202). The main processor 3 and so forth select one shape pattern that is the most similar to the lip shape of the non-impaired person from the lips shape patterns of the plurality of people stored in the main storage section 8 (at step 203). Specifically, the main processor 3 and so forth select a picture frame of which the number of matched pixels of "white-black" binary picture information is the maximum. After step 203, the main processor 3 and so forth extract a conversion table corresponding to the selected shape pattern from the memory (at step 204). Thereafter, the main processor 3 and so forth perform the operation shown in FIG. 7 with reference to the table 40. Thus, the conversation support apparatus 1 can more accurately perform the picture recognition. In addition, the conversation support apparatus 1 can more accurately convert a captured picture into sign information. Thus, since the occasion rate of conversion errors and so forth of the conversion process can be decreased, the users can smoothly converse with each other.

It should be noted that the present invention is not limited to the foregoing embodiments. Instead, various modifications of the present invention may be made.

According to the foregoing embodiments, the case that a non-impaired person and a hearing impaired person converse with each other was described. Instead, the present invention may be applied to the case that a Japanese person and a non-Japanese person converse with each other. In addition, according to the foregoing embodiments, a hearing impaired person and a visually impaired person may converse with each other. In this case, when sound that the visually impaired person pronounces is converted into character information or sign information and displayed on a display section, the hearing impaired person can understand the contents about which the visually impaired person converses through the display section. On the other hand, when sign information of the hearing impaired person is converted into sound information and output from the speaker 33, the visually impaired person can converse with the hearing impaired person through the speaker 33.

According to the foregoing embodiments, the contents about which the non-impaired person converse are displayed as sign information or character information on the second display section 32 as shown in FIG. 9. However, instead of sign information or in addition thereto, a moving picture of the lips of the non-impaired person may be displayed on the second display section 32. In this case, a picture of the lips displayed on the second main body 30 may be converted into an animation picture and displayed.

Figure 13:
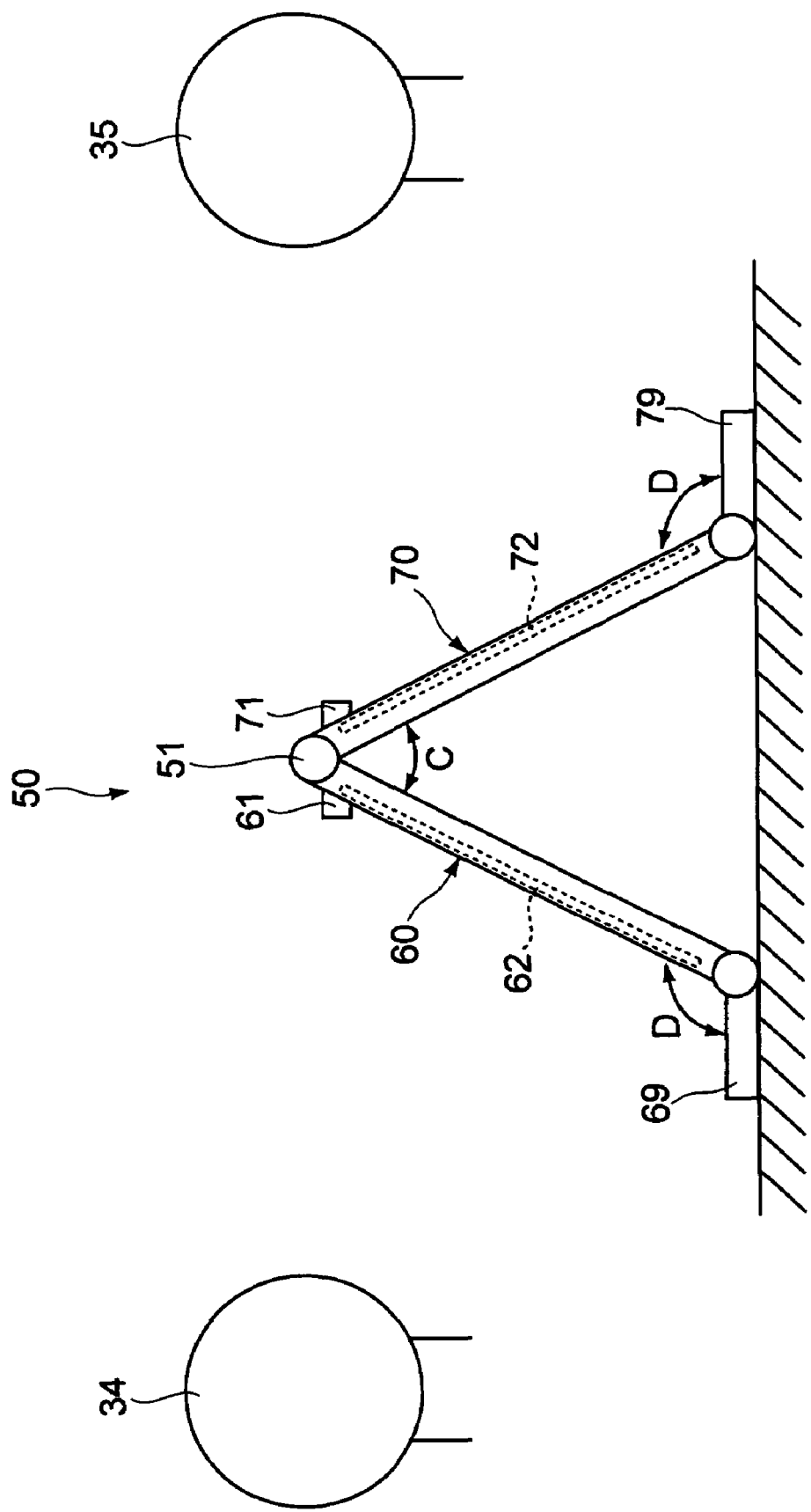
FIG. 13 is a side view showing a conversation support apparatus according to a further other embodiment of the present invention.

The shape of the conversation support apparatus 1 is not limited to the shape shown in FIG. 1. Instead, a conversation support apparatus shown in FIG. 13 may be used. The conversation support apparatus shown in FIG. 13 is denoted by reference numeral 50. The conversation support apparatus 50 is nearly the size of for example a lap-top computer. In the conversation support apparatus 50, a first main body 60 and a second main body 70 are connected with a connection portion 51 so that they can be folded at any angle C. The first main body 60 and the second main body 70 have leg portions 69 and 79 that can be rotated at any angle D. The leg portions 69 and 79 may be provided with operation buttons, a speaker, a microphone, and so forth (not shown). In FIG. 13, reference numerals 61 and 71 represent cameras. Reference numerals 62 and 72 represent display sections (display panels). With the conversation support apparatus 50, for example an non-impaired person 34 and a hearing impaired person 35 can converse with each other.

According to the foregoing embodiments, the non-impaired person first pronounces words. The sound pressure level determination section 9 determines the sound pressure level of the input words. Instead, the sound pressure level determination section 9 may determine the sound pressure level of words that the hearing impaired person initially pronounces. A listener may find it difficult to hear words that a hearing impaired person pronounces. However, when he or she pronounces some words, the conversation support apparatus can start the analysis process for a picture of a sign of the hearing impaired person by determining the sound pressure level of the words.

When the user operates a predetermined button of the operation button group 24, a trip play operation for a picture displayed on the display section 22 or the like and sound that is output from the speaker may be performed. The trick play operation is for example a fast forward operation, a rewind operation, or the like. When the fast forwarded operation is performed for a picture, picture frames stored in the RAM are intermittently displayed in the ascending order of for example frame numbers 3, 6, 9, and so forth. This trick play operation can be performed by the picture/sound reproduction process section 13 (refer to FIG. 2).

The conversion table 45 shown in FIG. 11 is a conversion table that correlates lips picture patterns and character information. However, the conversion table 45 may be a conversion table that correlates lips picture patterns and sign information or a conversion table that correlates lips picture patterns and sound information.

FIG. 12 describes an example of which an initial setting is performed before the user starts conversation. However, without the initial setting, immediately after the user starts conversing, the operation shown in FIG. 12 may be performed.

According to the foregoing embodiments, the first main body 20 has the microphone 23. However, the second main body 30 may have a microphone. In addition, only the second main body 30 has the speaker 33. Instead, the first main body 20 may have a speaker.

The number of sub processors is not limited to two. Instead, the number of sub processors may be one or three or more.

EXPLANATION OF CODES

| | |
|---|---|
| 1, 50 | Conversation support apparatus |
| 2a, 3a | Other end portion |
| 3 | Main processor |
| 4, 7 | RAM |
| 5, 6 | Sub processor |
| 8 | Main storage section |
| 9 | Sound pressure level determination section |
| 11 | Picture analysis program |
| 12 | Sound analysis program |
| 13 | Picture/sound reproduction process section |
| 14, 33 | Speaker |
| 15 | Threshold value setting section |
| 16 | Comparison section |
| 17 | Picture/sound database |
| 20, 60 | First main body |
| 21, 31, 61, 71 | Camera |
| 23 | Microphone |
| 25 | Person's lips picture pattern |
| 26 | Sound pattern |
| 27 | Character information |
| 28 | Sign information |
| 30, 70 | Second main body |

What is claimed is:

1. A conversation support apparatus, comprising:

picture capture means for capturing pictures of a first user and a second user;

first conversion means for converting first picture information of the first user, whose picture has been captured, into at least one of character information and sign information as first information that the second user is capable of perceiving;

second conversion means for converting second picture information of the second user, whose picture has been captured, into second information that the first user is capable of perceiving;

a first main body, having a first display screen for displaying the first information which has been converted;

a second main body, having a second display screen for displaying the second information which has been converted and also capable of displaying the first information;

a connection mechanism for connecting the first main body and the second main body so that the first display screen and the second display screen is capable of being placed at an angle different from each; and storage means for correlatively storing a plurality of picture patterns of lips of a person who pronounces sound and character information of the first information corresponding to sound that the person pronounces, wherein the picture capture means captures a picture of the lips of the first user as the first picture information, wherein the first conversion means has:

picture pattern comparison means for comparing the captured picture information and each of the picture patterns, picture pattern selection means for selecting one picture pattern corresponding to the captured lip picture information from the picture patterns corresponding to the compared result, and character information extraction means for extracting the character information corresponding to the selected picture pattern, wherein the storage means correlatively stores the picture patterns of each of the plurality of people and the character information and stores lips shape patterns of each of the plurality of people, and wherein the conversation support apparatus further comprises:

shape pattern comparison means for comparing the captured lip picture information and the shape patterns, and shape pattern selection means for selecting a shape pattern that is the most similar to the captured lip picture information from the shape patterns corresponding to the compared result.

2. The conversation support apparatus as set forth in claim 1, further comprising:

sound collection means for collecting sound of the first user; and third conversion means for converting the collected sound into the first information.

3. The conversation support apparatus as set forth in claim 2, further comprising:

measurement means for measuring a sound pressure level or a noise level of sound of the first user;

setting means for setting a threshold value of the sound pressure level or the noise level; and execution means for causing the third conversion means to execute a conversion process when the measured sound pressure level or noise level is equal to or larger than the threshold value.

4. The conversation support apparatus as set forth in claim 2, further comprising:

measurement means for measuring a sound pressure level or a noise level of sound of the first user;

setting means for setting a threshold value of the sound pressure level or the noise level; and execution means for causing the first conversion means to execute a conversion process when the measured sound pressure level or the noise level is equal to or larger than the threshold value.

5. The conversation support apparatus as set forth in claim 1, wherein the first conversion means converts the second picture information into sound information as the second information, and wherein the conversation support apparatus further comprises:

output means for outputting the converted sound information.

6. The conversation support apparatus as set forth in claim 1, wherein the first display screen displays the second information nearly in synchronization with timing the second display screen displays the second information.

7. The conversation support apparatus as set forth in claim 1,
wherein the first display screen displays the sign information, which has been converted by the first conversion means, and
wherein the second display screen displays the character information, which has been converted by the first conversion means, nearly in synchronization with timing the first display means displays the sign information.

8. The conversation support apparatus as set forth in claim 1, wherein the connection mechanism connects the first main body and the second main body so that the second main body is capable of being twisted against the first main body and also is capable of being folded to the first main body.

9. A conversation support apparatus, comprising:
picture capture means for capturing pictures of a first user and a second user;
first conversion means for converting first picture information of the first user, whose picture has been captured, into at least one of character information and sign information as first information that the second user is capable of perceiving;
second conversion means for converting second picture information of the second user, whose picture has been captured, into second information that the first user is capable of perceiving;
a first main body, having a first display screen for displaying the first information which has been converted;
a second main body, having a second display screen for displaying the second information which has been converted and also capable of displaying the first information, a connection mechanism for connecting the first main body and the second main body so that the first display screen and the second display screen is capable of being placed at an angle different from each other; and
storage means for correlatively storing a plurality of picture patterns of lips of a human who pronounces sound and sign information of the first information corresponding to sound that the human pronounces,
wherein the picture capture means captures a picture of the lips of the first user as the first picture information,
wherein the first conversion means has:
picture pattern comparison means for comparing information of the captured picture of the lips of the first user and the picture patterns;
picture pattern selection means for selecting one picture pattern corresponding to the information of the captured picture of the lips of the first user from the picture patterns corresponding to the compared result; and
sign information extracting means for extracting the sign information corresponding to the selected picture pattern,
wherein the storage means correlatively stores the picture patterns of each of the plurality of people and the sign information and stores lips shape patterns of each of the plurality of people, and
wherein the conversation support apparatus further comprises:
shape pattern comparison means for comparing the information of the captured picture of the lips of the first user and the shape patterns; and shape pattern selection means for selecting one shape pattern that is the most similar to the information of the captured picture of the lips of the first user from the shape patterns corresponding to the compared result.

* * * * *